United States Patent
Chevance et al.

(10) Patent No.: US 6,580,758 B1
(45) Date of Patent: Jun. 17, 2003

(54) METHOD OF CODING IMAGES AT VERY LOW DATA RATE AND CODING/DECODING DEVICE IMPLEMENTING THIS METHOD

(75) Inventors: Christophe Chevance, Rennes; Dominique Thoreau, Cesson Sevigne, both of (FR)

(73) Assignee: Thomson-CSF, Puteaux (FR)

( * ) Notice: Subject to any disclaimer, the term of this patent is extended or adjusted under 35 U.S.C. 154(b) by 0 days.

(21) Appl. No.: 08/137,189

(22) PCT Filed: Mar. 2, 1993

(86) PCT No.: PCT/FR93/00209

§ 371 (c)(1),
(2), (4) Date: Mar. 14, 1994

(87) PCT Pub. No.: WO93/18615

PCT Pub. Date: Sep. 16, 1993

(30) Foreign Application Priority Data

Mar. 3, 1992 (FR) .......................................... 92 02499

(51) Int. Cl.$^7$ ................................................ H04N 7/18
(52) U.S. Cl. .............................. 375/240.16; 375/240.14
(58) Field of Search ................................. 348/415, 416, 348/409, 408, 405, 699, 419, 402, 700, 411, 412, 413, 417; 375/240.01–240.29

(56) References Cited

U.S. PATENT DOCUMENTS

| 4,903,128 A |   | 2/1990  | Thoreau |          |
|-------------|---|---------|---------|----------|
| 4,982,285 A | * | 1/1991  | Sugiyama | 348/411 |
| 5,063,524 A |   | 11/1991 | Ferre et al. |      |
| 5,093,720 A | * | 3/1992  | Krause et al. | 348/416 |
| 5,136,377 A | * | 8/1992  | Johnston et al. | 348/415 |
| 5,155,594 A | * | 10/1992 | Bernstein et al. | 348/411 |
| 5,164,828 A | * | 11/1992 | Tahara et al. | 348/416 |
| 5,198,901 A | * | 3/1993  | Lynch | 348/415 |
| 5,227,878 A | * | 7/1993  | Puri et al. | 348/416 |
| 5,260,783 A | * | 11/1993 | Dixit | 348/416 |
| 5,295,201 A | * | 3/1994  | Yokohama | 382/48 |
| 5,317,397 A | * | 5/1994  | Odaka et al. | 348/416 |
| 5,598,216 A | * | 1/1997  | Lee | 348/416 |

FOREIGN PATENT DOCUMENTS

FR          0534282          3/1993

OTHER PUBLICATIONS

Proceedings of the National Communications Forum, vol. 42, No. 2, Sep. 30, 1988, Oak Brook, Illinois, US, pp. 1678–1682. H. Gharavi "Low bit rate television on ISDN".
Proceedings Pattern Recognition and Image Processing 1979, Chicago, Dec. 6, 1979, pp. 568–575, A. Ploysongsang Et Al. "DCT/DPCM processing of NTSC composite video signal".
Signal Processing. Image Communication, vol. 1, No. 2, Oct. 1989, Amsterdam, Netherlands, pp. 103–115, K.Grotz et al. "A 64Kbit/s codec with forward analysis and control" voir p. 113, colonne de droite, ligne 14–ligne 19; figure 10.

(List continued on next page.)

*Primary Examiner*—Andy Rao
(74) *Attorney, Agent, or Firm*—Oblon, Spivak, McClelland, Maier & Neustadt, P.C.

(57) ABSTRACT

A method and apparatus for differential coding of blocks of images includes coding the difference between a current block of an image to be transmitted and one of four blocks of the reconstructed current image in the closest vicinity of the current block. The device includes a differential image coding structure having a quantifier coupled to a variable-length coding device, a predictor and a device for reconstruction of the transmitted image coupled to a first image memory. The device further includes a second image memory for storing image blocks previously reconstructed in the image preceding the current image.

6 Claims, 2 Drawing Sheets

OTHER PUBLICATIONS

CCITT—Recommendation H261, No. 584, Apr. 1990, pp. 120–128 "Codec for audiovisual services at nx384kbit/s" cite dans la demande voir le document en entier.

ICASSP 89 International Conference on Acoustics, Speech and Signal Processing, Glasgow; May 23, 1989, IEEE, New York, US; p. 1671–1674, Saito et al, "Self organizing pattern–matching coding for picture signals" voir abrege; figures 1,2; voir p. 1672, colonne de gauche, ligne 13—colonne de droite, ligne 6.

* cited by examiner

| br<br>dx = -16<br>dy = -16 | br<br>dx = 0<br>dy = -16 | br<br>dx = +16<br>dy = -16 |
|---|---|---|
| br<br>dx = -16<br>dy = 0 | bc | | ns of bits
METHOD OF CODING IMAGES AT VERY LOW DATA RATE AND CODING/DECODING DEVICE IMPLEMENTING THIS METHOD

BACKGROUND OF THE INVENTION

1. Field of the Invention

The present invention relates to a method of coding images at very low data rate and a coding/decoding device implementing this method.

It applies especially to the production of low data-rate digital CODECs whose range of data rates lies between 8 and 16 Kb/s.

2. Discussion of the Background

In these coders the main coding modes used are intra-image coding modes and inter-image coding modes with movement compensation. The intra-image mode is, however, very little used due to the fact that, on the one hand, it is extremely costly in terms of number of bits transmitted, and that, on the other hand, sequence changes in the transmitted images generally pose enormous problems which are the cause, for example, of overflows of the storage capacity of buffer memories.

Among the known coding methods, those described, for example, by the "CITT specialist group on coding for visual telephony. Recommendation H261 version 11/1989", standard is certainly the one which is best adapted for transmitting images at very low data rate since it operates in differential mode in the time domain and by cosine transform in the spatial domain. The major interest in working in differential inter-image mode is in reducing redundancy and thereby the quantity of information to be coded. The use of the mode of coding by cosine transform has the advantage of supplying a totally decorrelated image. However, it is necessary to use both direct cosine transforms and inverse cosine transforms since the predictions done within the coders and decoders take place in the spatial domain.

Moreover, that necessitates structuring the image into blocks and macroblocks, a macroblock consisting, for example, of four luminance blocks of 8×8 size and of two chrominance signal blocks. A 16×16 luminance macroblock represents, on the image, the same surface area as an 8×8 chrominance block by reason of the sub-sampling which is used. A low-pass filter is inserted into the coding loop in order to reduce the artificial effects in the high frequencies due to the movement compensation and to lower the quantification noise in the prediction loop. The choice of the coding mode in an a priori approach, before coding of the coefficients, is done chronologically by first of all making a choice between the mode compensated in movement and the inter-image mode, this choice being guided on measurements of inter-image differences, then a choice between the mode adopted and the intra-image mode by comparison of the activity, or variance, of the grey levels contained in the blocks to be transmitted.

An image memory containing the reconstructed preceding image makes it possible to operate in differential mode in the time domain via inter-image and movement-compensated inter-image predictors. According to the fill state of the buffer memory the coefficients are quantified then dequantified with a step which is calculated by the regulation stage. A variable-length coding provides for adapting of the code words to the statistical properties of the information to be transmitted. The role of the regulation is to make the various parameters for coding of the contents of the image to be transmitted evolve so as to ensure the required data rate. Video multiplexing has the function of generating a binary train containing, among other things, the coded coefficients, the intra, inter and modes compensated inter-image coding words and the synchronization words of the various structures of the images. However, although performing well, this regulation mode always involves the risk that an overflow of the buffer memory will take place, on initialization especially upon transmission of the first image or upon changing of the observed scene in image sequences, and forces transmission of the images to be stopped each time this risk is present, which is prejudicial to the integrity of the information transmitted.

The object of the invention is to alleviate the abovementioned drawback.

SUMMARY OF THE INVENTION

To this end, the subject of the invention is a method of differential coding of blocks of television images characterized in that it consists in coding the minimum pixel-by-pixel difference between the current block of the image to be transmitted and one among four blocks of the reconstructed current image in the closest vicinity of the current block, the closest block being the one which, among the four, gives the best prediction of the current block for the coding.

The subject of the invention is also a device for implementing the method.

The method and the device have the advantage that they make it possible to reduce the use of the intra-image coding mode, upon abrupt changing of an observed scene for example, upon transmission of the first image of a sequence or upon changing of scenes or variations in gains of the image sensor. The substitution of the coding mode according to the invention for the intra-image coding mode makes it possible considerably to reduce the cost of coding of the blocks and to avoid increasing the quantification step for the transformed coefficients. The invention also has the advantage that it makes it possible to reduce the time for convergence of the coder towards operation in steady-state regime.

BRIEF DESCRIPTION OF THE DRAWINGS

Other characteristics and advantages of the invention will appear below with the aid of the description which follows, given with regard to the attached drawings which represent.

DESCRIPTION OF THE PREFERRED EMBODIMENT

Figure 1:
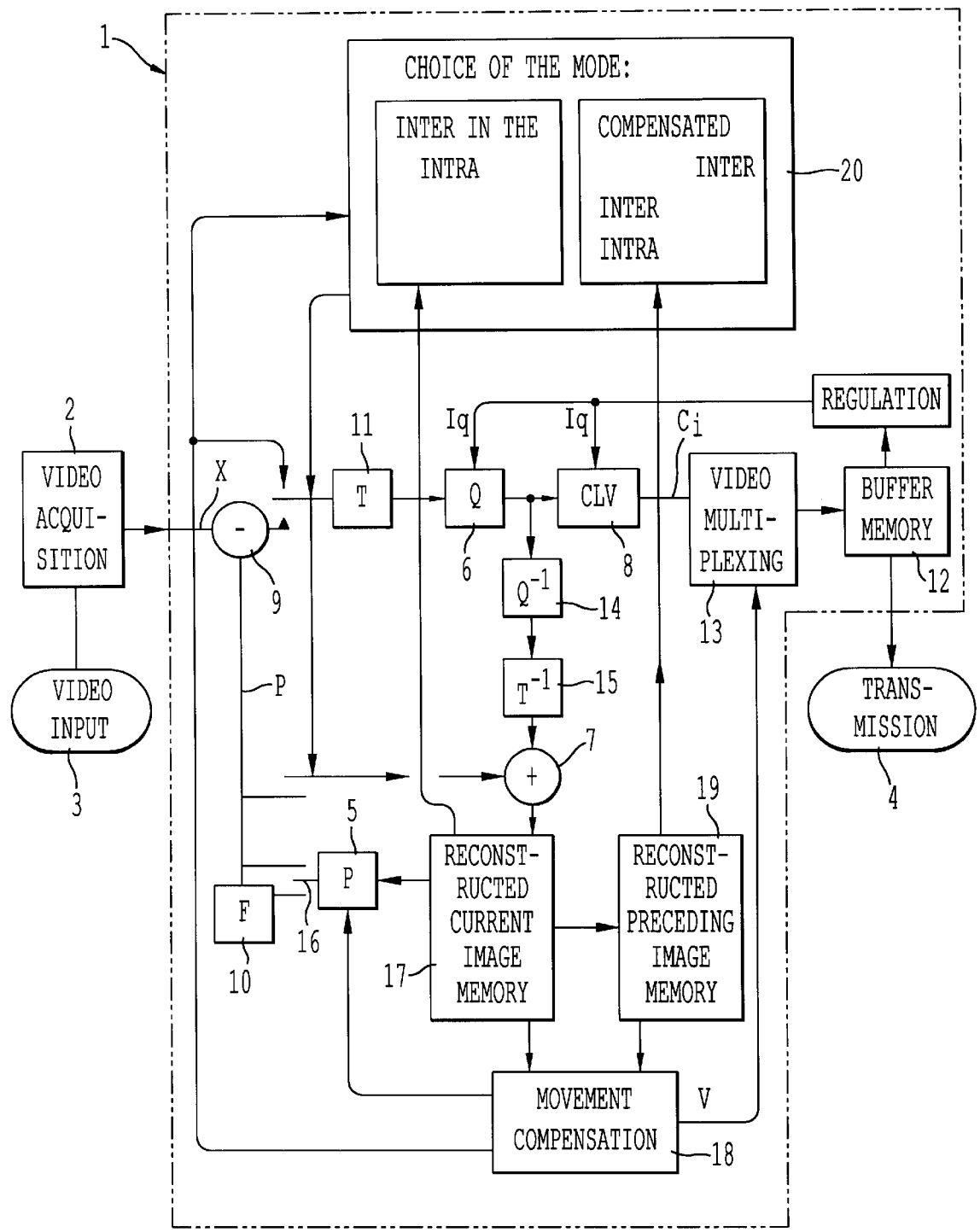
FIG. 1, an embodiment of a coder according to the invention.

The coder corder according to the invention which is represented in FIG. 1 includes a differential coding device 1 represented within a closed dotted line, coupled between a video signal acquisition device (line/block conversion) 2 originating, for example, from a television camera 3, and a transmission channel 4. The differential coding device 1 comprises, in a known way, a predictor 5, a quantifier 6, a transmitted images reconstruction device 7 as well as a code allocator formed by a variable-length coding device 8. The video image to be transmitted is applied by the image acquisition device 2 to a first input of a subtractor circuit 9 whose other input is linked to the output of the images predictor 5 by means of or not by means of a loop filter 10. The output of the subtractor circuit 9 is linked to the input of the quantifier 6 by means of a cosine transform calculating device 11. The predictor 5 delivers a prediction value p on the first input of the subtractor circuit 9. Each image value to be coded, X, is reduced by its prediction value p applied in the form of the difference d=X−p to the input of the quantifier 6 after having been transformed by the cosine transform calculating device 11.

To each quantification level the code allocator 8 associates a code $C_i$ which is stored in a buffer memory 12 before being transmitted on the transmission channel 4. The multiplexing circuit 13 carries out transmission of the codes $C_i$ into the buffer memory 12. The quantified signal obtained at the output of the quantification circuit 6 is applied to a first input of the reconstruction circuit 7 via a dequantification circuit 14 and an inverse cosine transform calculating device 15. The second input of the reconstruction circuit 7 is linked to the output of the prediction circuit 5 or to the output of the loop filter 10 via a routing circuit 16.

The image samples reconstructed by the images reconstruction circuit 7 are stored within an image memory 17. These samples are then applied, on the one hand, to the prediction circuit 5 through a movement compensation device 18 and, on the other hand, into an image memory 19 in order to put into memory each reconstructed image which precedes the reconstructed current image. A control device 20 makes it possible to carry out switching of the inter-image or intra-image coding modes. The image memory 19 which contains a reconstructed image of the image which precedes the current image makes it possible to operate in differential mode in the time domain by carrying out an inter-image or movement-compensated inter-image prediction.

According to the fill state of the buffer memory 12 the coefficients are quantified by the quantifier 6 and dequantified by the dequantifier 14 with a quantification step calculated by the regulation stage. The variable-length coding which is carried out by the code allocator 8 adapts the code words to the statistical properties of the information to be transmitted. The regulation role which the loop formed by the elements 5 to 19 has is to make the various parameters for coding the contents of the image to be transmitted evolve with a view to providing the required data rate. The video multiplexing which is carried out by the multiplexer 13 has the function of generating the binary train containing, among other things, the coded coefficients, the intra, inter and compensated inter-image coding modes and the synchronization words for the various structures of the images.

Figures 2, 3:
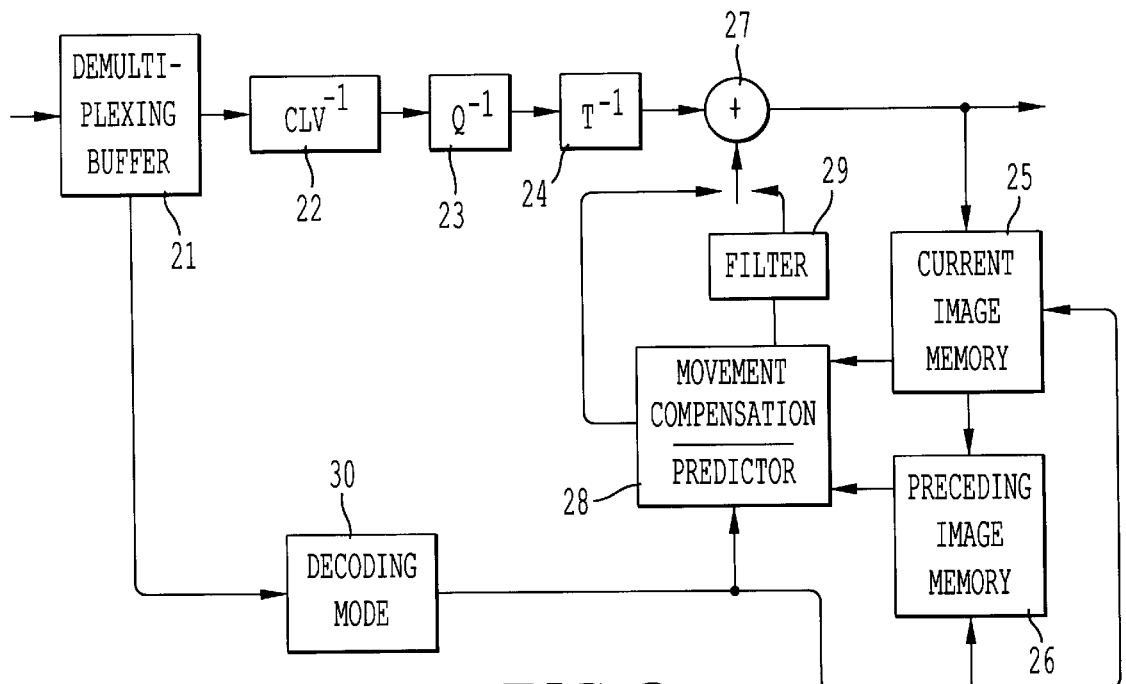
FIG. 2, an embodiment of a decoder according to the invention.
FIG. 3, an illustration of the mode of prediction of a current macroblock with the aid of reconstructed adjacent macroblocks.

According to the invention, a fourth mode of inter coding in the current image is inserted among the three previously described coding modes. It is characterized by the use of the image memory 17 of the reconstructed current image and makes it possible to code the difference which exists between a current macroblock and an adjacent macroblock of the current image which is the most similar among the four reconstructed respectively at positions offset, dx on the horizontal axis and dy on the vertical axis, with respect to the current blocks of (−16, 0), (−16, −16), (0, −16), (+16, −16) as FIG. 3 illustrates. In order to resolve the problems of decision at the edge considered with respect to the preceding reconstructed macroblocks, it is necessary to consider that the first macroblock situated at the upper left corner cannot be coded by this mode, or that, for the first macroblock line, only the preceding macroblock on the same line (−16, 0) can be envisaged, or that, for the first column of macroblocks, the macroblocks in position (0, −16) and (+16, −16) are to be considered and finally for the last column of macroblocks the macroblocks in (−16, 0), (−16, −16) and (0, −16) can be considered. In the presence of these four coding possibilities, the choice of the coding mode in an a priori approach may then be made by choosing between the inter-image compensated mode and the inter compensated mode in the current image relying on the differences which exist between the macroblock to be coded and the compensated macroblocks, then, by making a choice between the compensated mode and the inter-image mode, relying on measurements of inter-image differences and finally making a choice between the mode previously adopted and the intra-image mode by comparison of the activity or of the variance in the grey levels contained in the blocks to be transmitted.

The implementation of the choice of the prediction mode is made by virtue of the reconstructed current image memory 17 and of the image memory 19 of the reconstructed preceding current image which allow the control device 20 to produce the difference between each current macroblock to be transmitted and the reconstructed adjacent macroblocks. The selection of the macroblock in the reconstructed current image memory 17 which is made by the control device 20 then corresponds to the best prediction of the current macroblock which is obtained by calculating the minimum difference between the adjacent macroblocks of FIG. 3 with the one to be transmitted. This makes it possible, as from the initialization of a new image sequence, to work in inter-image coding mode in the current image with a very low coding cost, eliminating the risks of overflowing the buffer memory 12. The addition of an additional code word is controlled by the control device 20 in order to dissociate this new prediction mode from the other modes.

A corresponding decoder is represented in FIG. 2. It includes a buffer memory 21, a variable-length code word decoder 22 coupled to a dequantification circuit 23 and an inverse cosine transform calculating circuit 24, the assembly of the elements 21, 22, 23 and 24 being linked in this order in series. It also includes a current image memory 25 coupled to an image memory for the preceding image 26. A circuit for reconstruction of the image 27 receives, on a first input, the signal decoded by the elements 21, 22, 23 and 24 and, on a second input, the signals read in the memories 25 and 26 through a movement compensation device 28 and possibly from a low-pass filter 29. A control device 30 provides control of the movement compensators and of the image memories 28, 25 and 26 on the basis of code words received by the decoder in order to place the image reconstruction circuit 27 either an inter-image coding mode, or an inter-image with movement compensation coding mode, or in intra-image coding mode, or in mode for coding the difference between each current block and four others previously reconstructed in the closest vicinity and stored in the memory 25.

This makes it possible to limit the use of the intra-image coding mode upon abrupt changing of an observed scene, brought about, for example, by the transmission of a first image of a sequence, a change of scene or a variation in gain of an image sensor, by reducing the quantification step for the transformed coefficients, and thereby the time for convergence towards operation in steady-state regime by the coder and the decoder.

What is claimed is:

1. A method of coding of blocks of television images including intra-image coding and differential coding wherein said differential coding consists in coding a minimum pixel-by-pixel difference between a current block of a current image to be transmitted and one among four reconstructed blocks of the same current image in a closest vicinity of the current block, said one closest block being the one which, among the four gives the best prediction of the current block for the coding, said method further comprising the steps of storing, in a first memory, the reconstructed current image and storing, in a second memory, a reconstructed preceding image, wherein said differential coding enables the reduction of intra-image coding costs of said television images.

2. Method according to claim 1, characterized in that the image blocks are coded by cosine transform.

3. A device for coding of blocks of television images including intra-image coding, and differential coding wherein said differential coding consists of encoding a minimum pixel-by-pixel difference between a current block of a current image to be transmitted and one among four reconstructed blocks of the same current image in a closest vicinity of the current block, said one closest block being the one which among the four, gives the best prediction of the current block for the coding, said device comprising differential coding means, a quantifier coupled to a variable-length coding device, a predictor and a device for reconstruction of a transmitted image coupled to a first image memory, said device further including a second image memory coupled to said differential coding means for storing the four reconstructed image blocks of the current image to feed the differential coding means with the selected reconstructed block of the current image, wherein said differential coding enables the reduction of intra-image coding cost.

4. Device according to claim 3 characterized in that it comprises a device for control of the predictor in order to allow execution of a coding of the images in the simple "inter-image", "inter-image with movement compensation" and "intra-image" modes, and coding of the difference between each current block of the image to be transmitted and one of the four reconstructed blocks in the closest vicinity of the current block in the current image.

5. A method of coding according to claim 1, wherein said method of coding further includes at least one of inter-image coding and inter-image coding with movement compensation.

6. A device according to claim 3, wherein said coding of blocks of television images further includes at least one of inter-image coding and inter-image coding with movement compensation.

* * * * *